(12) United States Patent
Bhuiyan et al.

(10) Patent No.: US 12,450,239 B2
(45) Date of Patent: Oct. 21, 2025

(54) METHODS AND APPARATUS FOR IMPROVING SEARCH RETRIEVAL

(71) Applicant: Walmart Apollo, LLC, Bentonville, AR (US)

(72) Inventors: Md Mansurul Alam Bhuiyan, San Jose, CA (US); Suhas Ranganath, Bangalore (IN); Shuangyu Li, Mountain View, CA (US); Min Xie, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/179,274

(22) Filed: Feb. 18, 2021

(65) Prior Publication Data

US 2022/0261406 A1     Aug. 18, 2022

(51) Int. Cl.
*G06F 16/242*     (2019.01)
*G06F 16/2457*    (2019.01)

(52) U.S. Cl.
CPC ...... *G06F 16/24575* (2019.01); *G06F 16/243* (2019.01)

(58) Field of Classification Search
CPC .......... G06N 3/006; G06N 5/02; G06N 5/022; G06F 16/532; G06F 16/583; G06F 16/24578; G06F 16/24522; G06F 16/248; G06F 16/9032; G06Q 30/0625; G06Q 30/0643
USPC ........ 707/721, 765–769, 603, 748–749, 701, 707/798, 804–805, 17.112, 17.63, 17.139, 707/17.138, 17.137, 17.143, 17.142, 707/17.141, 17.14, 17.134, 17.26, 17.15, 707/17.68
See application file for complete search history.

(56) References Cited

U.S. PATENT DOCUMENTS

| | | | | |
|---|---|---|---|---|
| 8,315,849 | B1 * | 11/2012 | Gattani ................. | G06F 40/295 704/10 |
| 8,396,884 | B2 * | 3/2013 | Singh .................. | G06F 16/9024 707/760 |
| 8,843,468 | B2 * | 9/2014 | Ni ....................... | G06F 16/3331 707/708 |
| 8,868,548 | B2 | 10/2014 | Kurzion | |

(Continued)

OTHER PUBLICATIONS

Larson, Jonathan et al., "Making Sense of Search: Using Graph Embedding and Visualization to Transform Query Understanding", CHI 2020, Conference on human Factors in Computing Systems, Extended Abstracts, CHI 2020 Case Study, Honolulu, HI, Apr. 25-30, 2020, pp. 1-8.

(Continued)

*Primary Examiner* — Tony Mahmoudi
*Assistant Examiner* — Linh Black
(74) *Attorney, Agent, or Firm* — Morgan Lewis & Bockius LLP; Manita Rawat

(57) ABSTRACT

The disclosed subject matter relates to a system and method for providing an extended search. The system generates a list of similar intent groups based on previous engagements linking queries and intents. Upon the detection of an intent in a user query, the system accesses similar intents from the similar intent group and incorporates them into the query of the product catalog in order to obtain a complete set of results. The creation of the similar intent groups uses bipartite graphs and graph embedding to identify intents close in distance.

20 Claims, 6 Drawing Sheets

(56) References Cited

U.S. PATENT DOCUMENTS

| | | | |
|---|---|---|---|
| 10,572,511 B2* | 2/2020 | Anderson | G06F 16/20 |
| 11,210,341 B1* | 12/2021 | Bhagat | G06F 16/90335 |
| 2002/0138481 A1 | 9/2002 | Aggarwal et al. | |
| 2003/0120630 A1* | 6/2003 | Tunkelang | G06F 16/2455 |
| 2004/0042661 A1* | 3/2004 | Ulrich | G06K 9/468 |
| | | | 382/181 |
| 2007/0033221 A1* | 2/2007 | Copperman | G06F 16/36 |
| 2009/0327260 A1* | 12/2009 | Li | G06F 16/3338 |
| | | | 707/999.005 |
| 2010/0225650 A1* | 9/2010 | Grzybowski | G16C 20/10 |
| | | | 345/440 |
| 2011/0161311 A1* | 6/2011 | Mishne | G06F 16/951 |
| | | | 707/769 |
| 2011/0208730 A1* | 8/2011 | Jiang | G06F 16/951 |
| | | | 707/738 |
| 2011/0289081 A1* | 11/2011 | Willits | G06F 16/24522 |
| | | | 707/769 |
| 2012/0036123 A1* | 2/2012 | Hasan | G06F 16/95 |
| | | | 707/E17.084 |
| 2012/0137367 A1* | 5/2012 | Dupont | G06F 21/00 |
| | | | 726/25 |
| 2012/0158621 A1* | 6/2012 | Bennett | G06F 16/334 |
| | | | 706/12 |
| 2012/0226641 A1* | 9/2012 | Hu | G06F 16/35 |
| | | | 706/12 |
| 2012/0226687 A1* | 9/2012 | Xu | G06F 16/3338 |
| | | | 707/723 |
| 2012/0259801 A1* | 10/2012 | Ji | G06N 20/00 |
| | | | 706/12 |
| 2012/0323877 A1* | 12/2012 | Ray | G06F 16/9535 |
| | | | 707/706 |
| 2013/0013596 A1* | 1/2013 | Wang | G06F 16/3322 |
| | | | 707/728 |
| 2013/0117204 A1* | 5/2013 | Vadlamani | G06N 5/022 |
| | | | 706/54 |
| 2014/0304249 A1* | 10/2014 | Ayzenshtat | G06F 16/24578 |
| | | | 707/709 |
| 2014/0337358 A1* | 11/2014 | Mitra | G06F 16/24578 |
| | | | 707/748 |
| 2014/0379473 A1* | 12/2014 | Zhou | G06Q 30/0256 |
| | | | 705/14.54 |
| 2015/0052098 A1* | 2/2015 | Kveton | G06Q 50/01 |
| | | | 706/52 |
| 2015/0220530 A1* | 8/2015 | Banadaki | G06F 16/90 |
| | | | 707/723 |
| 2015/0261754 A1* | 9/2015 | Bai | G06F 16/435 |
| | | | 707/749 |
| 2015/0356199 A1* | 12/2015 | Mei | G06F 16/58 |
| | | | 707/728 |
| 2016/0364753 A1* | 12/2016 | Zhang | G06Q 30/0255 |
| 2017/0031480 A1* | 2/2017 | Gabriel | F24C 7/086 |
| 2018/0107685 A1* | 4/2018 | Kale | G06V 10/758 |
| 2018/0108066 A1* | 4/2018 | Kale | G06F 16/583 |
| 2018/0358988 A1* | 12/2018 | Sharon | H03M 13/1111 |
| 2019/0236215 A1* | 8/2019 | Agarwal | G06F 16/9014 |
| 2020/0294071 A1* | 9/2020 | Christensen | G06Q 30/0204 |
| 2020/0311707 A1* | 10/2020 | Achan | G06Q 40/00 |
| 2021/0090694 A1* | 3/2021 | Colley | G16B 40/00 |
| 2021/0173981 A1* | 6/2021 | Guidi | G06F 30/00 |
| 2021/0295822 A1* | 9/2021 | Tomkins | G16H 70/60 |
| 2022/0121665 A1* | 4/2022 | Diskin | G06F 16/24526 |

OTHER PUBLICATIONS

Romanov, Aleksey et al., "Understanding search query intent with deep learning", Grid Dynamics Blog, found at:https://blog.griddynamics.com/understanding-search-query-intent-with-deep-learning/, Feb. 22, 2020, 10 pages.

Zhang Yuan et al., "Neural IR Meets Graph Embedding: A Ranking Model for Product Search", The Web Conference, San Francisco, CA, Found at: arXiv:1901.008286v1, Jan. 24, 2019, 11 pages.

* cited by examiner

METHODS AND APPARATUS FOR IMPROVING SEARCH RETRIEVAL

TECHNICAL FIELD

The disclosed subject matter relates generally to automated assistants providing information from a database to a user in response to a user communication. Specifically, an automated shopping assistant providing relevant products by extending the search query to similar product types.

BACKGROUND

In recent years, with the development of cognitive intelligence technology, the success rate of speech recognition has been greatly improved, and applications based on speech recognition as well as natural language processing have also been comprehensively promoted. In addition to basic applications such as voice input, voice-based and text-based human-computer interaction applications such as voice and online assistants (i.e. automated assistants) have gradually become the standard configuration of intelligent systems. Such assistants can allow users to interact with devices or systems using natural language in spoken and/or text forms. For example, a user can provide a speech input containing a user request to an automated assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

In the prior art, the voice assistant is usually used in conjunction with the knowledge base. The front end first recognizes the user's voice input, converts the voice information into text information, and then queries in the knowledge base, and then matches the query with the voice content.

Intelligent automated assistants can provide an intuitive interface between users and electronic devices. Furthermore a digital assistant can be utilized to assist with searching for consumer products and/or there attributes.

While natural language processing may result in an intent (i.e. product type), similar intents may not be searched. Automotive batteries and vehicle batteries, Pencil cases and pencil boxes are examples of similar/related intents. If the natural language processing (intent detection process) is unable to predict all the similar related intents, the resultant search will fail to extract all of the relevant items matching all the intents from the catalog (database).

In prior art systems, a user query for "jeep liberty battery" may lead to a detected intent of "Automotive Batteries" and the resultant search using the detected intent for example returns:

Battery for Harley classic liberty 1986-$69.99;
Revolution Mobility Liberty 312 Power Wheel Chair Battery-$63.99;
Major Mobisist Liberty Wheelchair Battery-$89.19; and,
Replacement for Jeep Liberty Battery 2011-$376.89.

A search using a similar intent "Vehicle Batteries" along with the intent of "Automotive Batteries" as described in the disclosed subject matter advantageously returns:

Replacement for Jeep Liberty Battery 2011-$376.89;
Replacement for Jeep Liberty Battery 2007-$352.68;
Replacement for Jeep Liberty Battery 2009-$352.68; and,
Replacement for Jeep Liberty Battery 2011-$352.68.

Thus searching only the "Automotive Batteries" intent misses relevant items (the last three products), but by adding similar intents for example "Vehicle Batteries" (in the example above) and/or "Car Batteries" as described in the disclosed subject matter herein, the most relevant products including those missed are advantageously captured. Retrieving the most relevant returns is recognized as an important search metric which is particularly beneficial in an online retail environment.

SUMMARY

The embodiments described herein are directed to a system and method for retrieving information from a knowledge base in response to a user's natural language question, specifically with an automated shopping assistant. In addition to or instead of the advantages presented herein, persons of ordinary skill in the art would recognize and appreciate other advantages as well.

In accordance with various embodiments, exemplary systems may be implemented in any suitable hardware or hardware and software, such as in any suitable computing device.

In some embodiments, a system extending the retrieval of relevant information from a knowledge base is provided. The system including a communication system a database containing the knowledge base; and, a computing device connected to both the database and the communication system. The computing device configured to associate first and second intents or even multiple intents based on similarity of intents as determined from prior engagements between prior queries and prior intents; receive an input query from a user; detect a first intent of the input query via a natural language processor; and retrieve the second intent (or all the intents associated with the first intent) based upon its association with the first intent. The computing device also configured to create an extended query containing the first intent and the second intent (or all the intents associated with the first intent); query the database with the extended query; and receive and transmit the extended query results from the database to the user in response to the input query.

In some embodiments, a method for improving search retrieval is provided. The method includes associating a plurality of intents including a first intent to a second intent based on the similarity of intents determined from prior engagements between prior queries and prior intents. Subsequent the step of associating, the method includes receiving an input query from a user; detecting the first intent of the input query via a natural language processor; retrieving the second intent based upon being associated with the first intent; creating an extended query containing the first intent and the second intent; and querying a database with the extended query. The method further includes receiving and transmitting the extended query results, to the user in response to the input query.

In yet other embodiments, a non-transitory computer readable medium having instructions stored thereon is provided. The instructions, when executed by at least one processor, cause a device to perform operations. The operations a first module for determining similar intents by accessing prior engagements including the prior queries and prior intents resultant from the prior queries; mapping the prior queries to the respective prior intents; creating a bipartite graph between the prior queries and prior intents, applying a graph embedding methods over the bipartite graph to determine distance between prior intents, and grouping prior intents together into a plurality of similar intent groups based upon the respective distance between the prior intents and storing the intent groups. The instruction also include operations in a second module that perform an extended search, including receiving an input query from a user; detecting the first intent of the input query via a natural language processor; retrieving the second intent based upon the similar intent group of the first intent; and creating an extended query containing the first intent and the second intent. The instruction further cause the operations of querying a database with the extended query and receiving the extended query results from the database; and, transmitting the extended query results to the user in response to the input query.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

Figure 1:
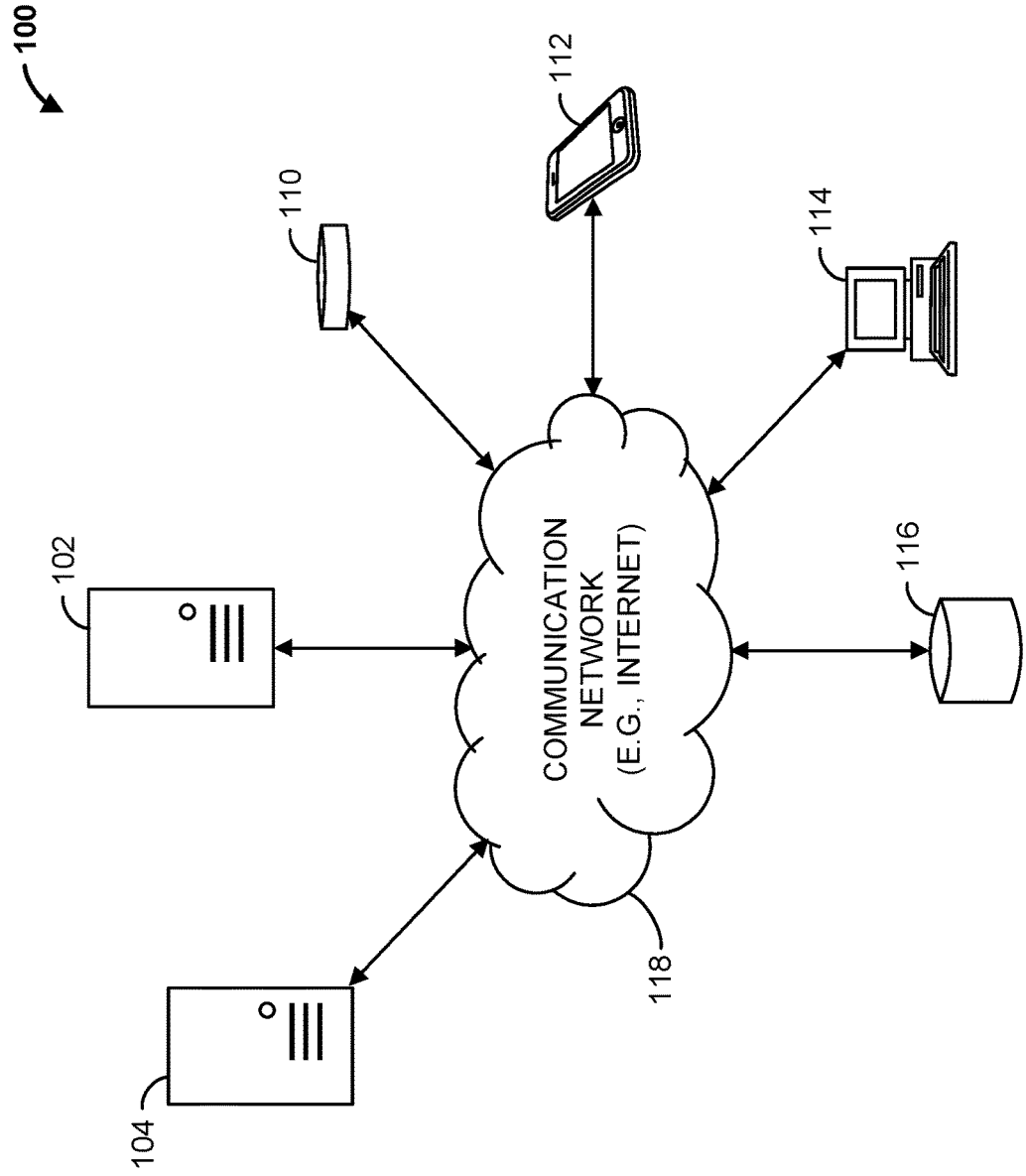
FIG. 1 is a block diagram of communication network used to retrieve relevant information contained in the knowledge base in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

DETAILED DESCRIPTION

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a communication system 100 that includes an extended search computing device 102 (e.g., a server, such as an application server), a web server 104, database 116, and multiple customer computing devices 110, 112, 114 operatively coupled over network 118.

An extended search computing device 102, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, or through the communication network 118.

In some examples, the extended search computing device 102 may be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, extended search computing device 102, and web server 104 are operated by a retailer, and multiple customer computing devices 112, 114 are operated by customers of the retailer.

Although FIG. 1 illustrates three customer computing devices 110, 112, 114, advertisement system 100 can include any number of customer computing devices 110, 112, 114. Similarly, the communication system 100 can include any number of workstation(s) (not shown), extended search computing devices 102, web servers 104, and databases 116 and 117.

The extended search computing device 102 is operable to communicate with database 116 over communication network 118. For example, the extended search computing device 102 can store data to, and read data from, database 116. Database(s) 116 may be remote storage devices, such as a cloud-based server, a disk (e.g., a hard disk), a memory device on another application server, a networked computer, or any other suitable remote storage. Although shown remote to the extended search computing device 102, in some examples, database 116 may be a local storage device, such as a hard drive, a non-volatile memory, or a USB stick. The extended search computing device 102 may store data from workstations or the web server 104 in database 116. In some examples, storage devices store instructions that, when executed by the extended search computing device 102, allow the extended search computing device 102 to determine one or more results in response to a user query.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Figure 2:
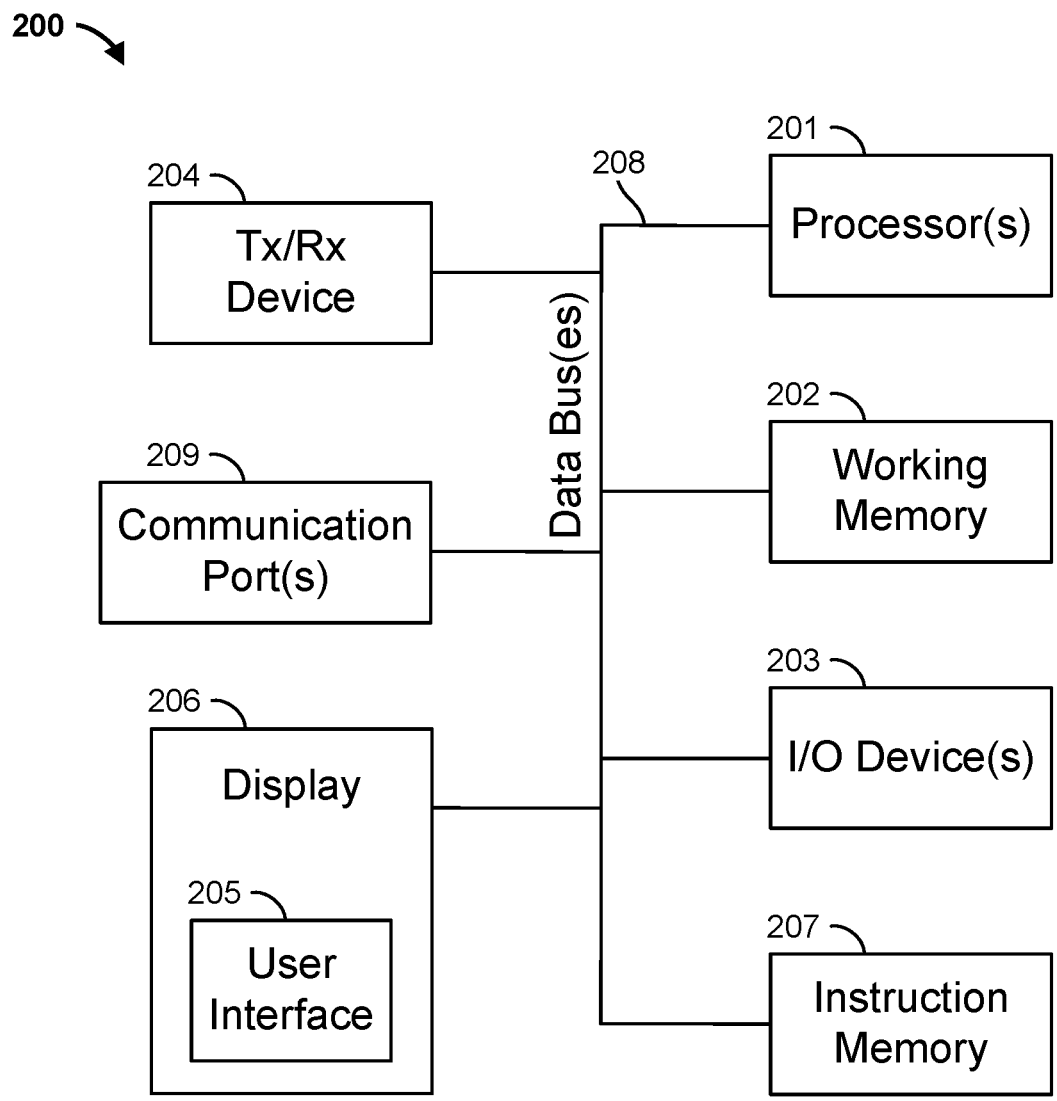
FIG. 2 is a block diagram of the computing device of the communication system of FIG. 1 in accordance with some embodiments.

FIG. 2 illustrates the extended search computing device 102 of FIG. 1. The extended search computing device 102 may include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of the extended search computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with extended search computing device 102. In some examples, a user can interact with user interface 205 by engaging input-output devices 203. In some examples, display 206 can be a touchscreen, where user interface 205 is displayed by the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 extended search computing device 102 will be operating in. Processor(s) 201 is operable to receive data from, or send data to, a network, such as communication network 118 of FIG. 1, via transceiver 204.

Figure 3:
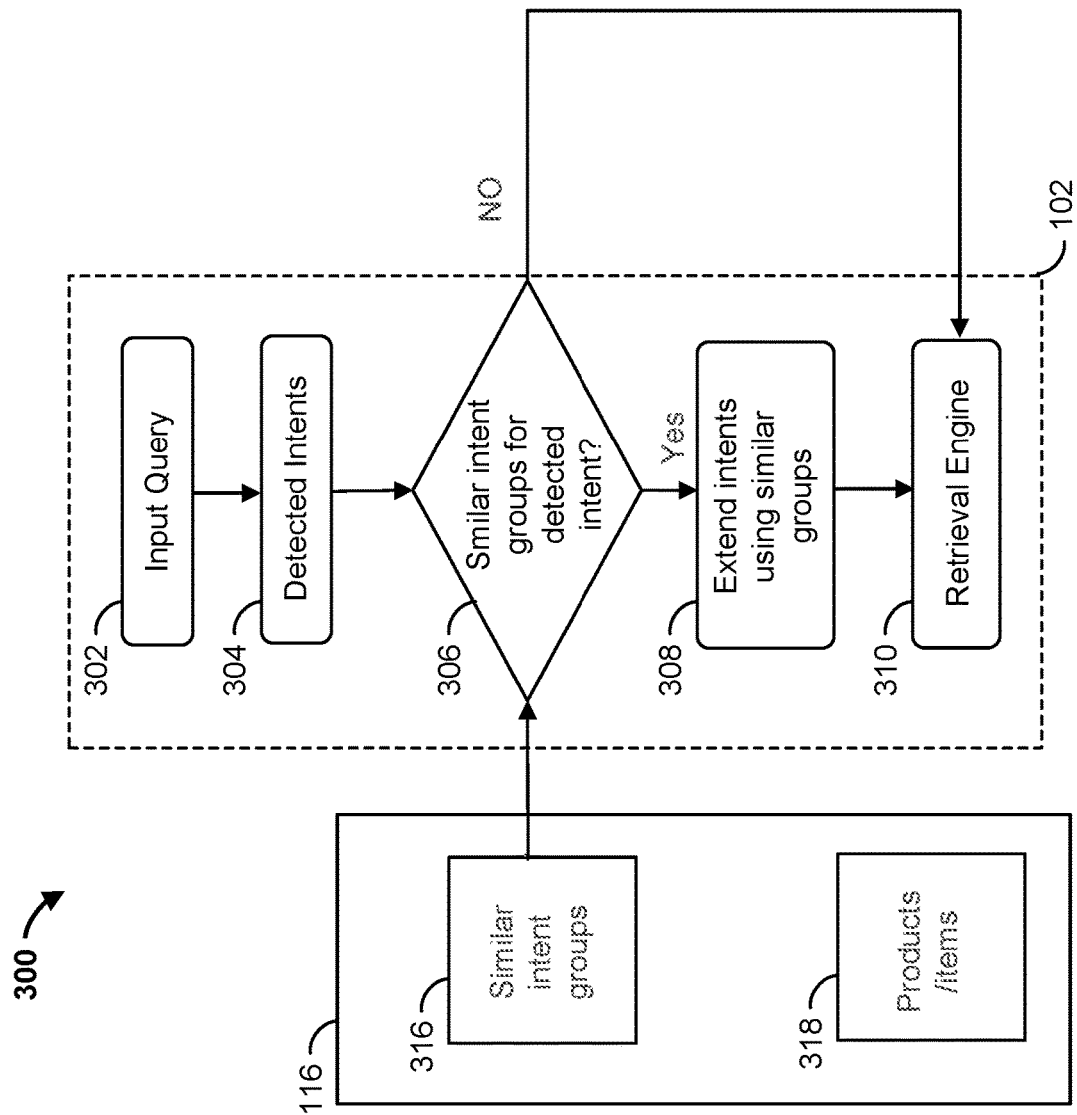
FIG. 3 is a schematic diagram according to some embodiments.

FIG. 3 illustrates at a high level an automated assistant system 300 with an extended search computing device 102 and a database 116 having similar intent groups 316 and a product/item catalog 318. An input query is received 302 and the intents are detected in 304 using natural language understanding technique, a determination is made as to whether the detected intent has a similar intent group associated with it as shown in Block 306. If there are no associated similar intent groups, the search is undertaken using the detected intent. Upon a determination that the detected intent is associated with a similar intent group, the associated similar intent group 316 is accessed and a query is developed with the intents within the similar intent group and the product/item catalog 316 is searched with the expanded query.

Figure 4:
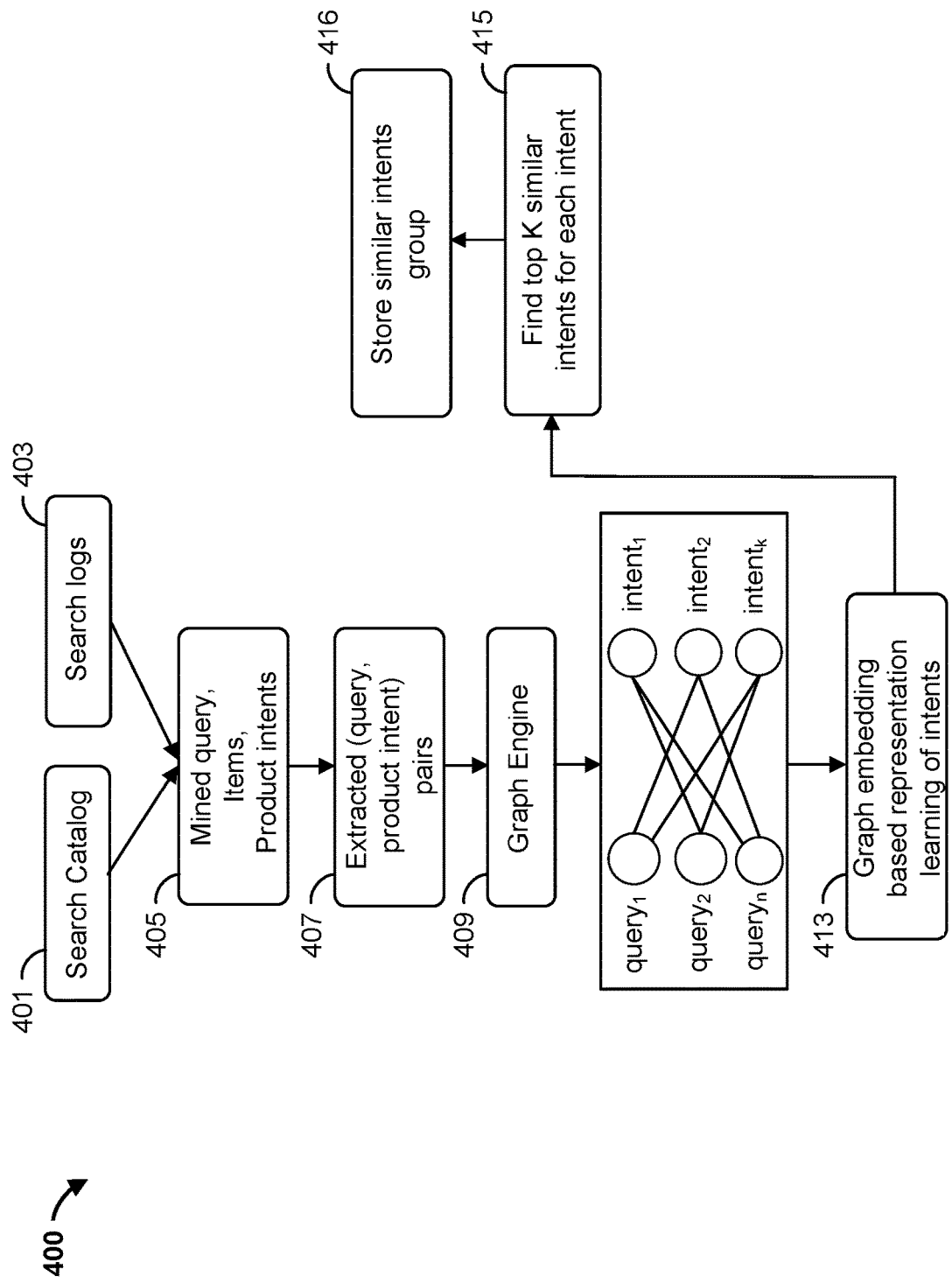
FIG. 4 is a flow diagram for grouping similar intents in accordance with embodiments of the disclosed subject matter.
Figure 5:
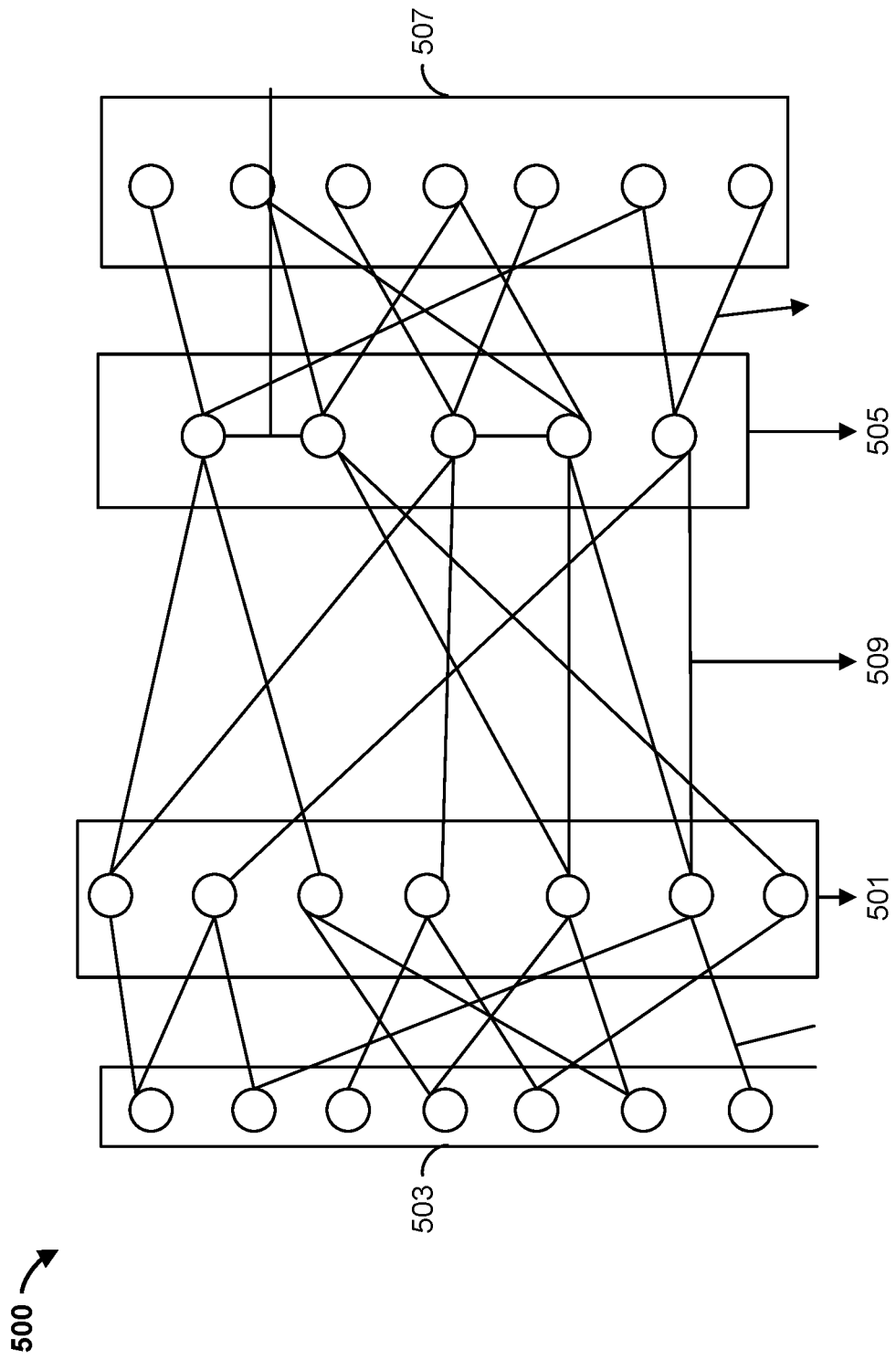
FIG. 5 is an illustration of a bipartite graph.

FIG. 4 illustrates an exemplary process 400 for the creation of similar intent groups used in the extended search of FIG. 3. The search catalog 401 contains the products/items/services for example offered by entity (e.g. retailer). The search logs 403 contain the queries previously used to search for products/items/services etc. in the search catalog 401. Using the search catalog 401 and the search logs 403 both of which are accessed with authorization, queries, items and intents (i.e. product types) are mined 405 and pairs are collected 407. Each pair represents a query linked to an intent via an engagement. Engagements may be search returns, views, clicks, add-to-cart, or purchases, etc. For example as a result of a query of Charcoal grills, the user clicks on one of the Costway outdoor BBQ, or adds the product to the cart for purchase, the query and the intent (product type) would be paired via the engagement. The extracted pairs are used to create a bipartite graph as shown in FIG. 5. Graph embedding 413, a technique well known in the art, is performed which results in the bipartite graph being represented in vector form, examples of graph embedding as known in the art include Deep walk, Random walk, Word2vec, skip-gram, among others. The similar intents are grouped together 415 based on the vector distance between intents and the resultant groups are stored 416 to be used in the extended search. The stronger the engagements used to create the bipartite graph (purchases>add-to-cart>click>view>search result) the more confidence may be attributed to the similar intent groups, similarly the smaller the distance threshold to determining similar intents with result in higher confidence. Conversely the higher confidence may reduce the number of similar intent groups identified.

FIG. 5 is an illustration of a bipartite graph 500 of the queries 501 and intents 505 connected by the engagements 509. The graph, as shown, includes links between the query words 503 and intent titles words 507, thus forming a series of three bipartite graphs.

Figure 6:
FIG. 6 is a flowchart of a method in accordance with embodiments of the disclosed subject matter.

Turning to FIG. 6, is a method 600 for search retrieval which incorporates searching similar intents such that a more complete set of relevant items matching the search intent are retrieved. The method as shown in Block 601 includes associating a first intent for example "Charcoal Grill" with a second intent for example "Combo Grill/Smoker", the association based on similarity of intents determined from prior engagements between prior queries and prior intents. It is important to note that there may be multiple similar intents associated with the first intent, for example in addition to the second intent "Combo Grill/Smoker", a third intent may be "BBQ Grill" and fourth intent "Outdoor Grills" may be associated with "Charcoal Grill" in a similar intent group. To associate similar intents, prior engagements including the prior queries and prior intents are mapped (i.e. query linked to intent) and a bipartite graph is created between the plurality of queries and their intents. Graph embedding methods are undertaken on the bipartite graph in which the graph is converted into a plurality of vectors representing the prior intents. The prior intents are grouped together into a plurality of similar intent groups based upon the respective distance between the prior intent nodes (or closest K neighbors). For example a threshold distance may be established and each intent node within the threshold distance D to each other assigned to the same similar intent group, or the K number of closest neighbors are each assigned the same similar intent group. Each member of a similar intent group is associated with all the members of the group. This association step is done prior to conducting the extended search and may be conducted on the same or different hardware, additionally, the associations may be rerun and updated at predetermined time periods or upon the occurrence of pre identified events. These similar intents groups are stored in a database 316 and preferably indexed to each group member.

Upon receiving an input query as shown in Block 603 (Show me charcoal grills?), the extended search computing device 102 with a natural language processor detects the intent of the query (Charcoal Grill) as shown in Block 605. A second intent (Combo Grill/Smoker) is selected based on the previous association/grouping of the second intent with the first intent as shown in Block 607. The first intent and second intent are used to create an extended query in Block 609, for example "SEARCH for [Charcoal Grills or Combo Grill/Smoker]." The first intent and second intent may be in a similar intent group along with other intents, such as "BBQ Grills" in which case, the extended query would also include the other members of the similar intent group "SEARCH for [Charcoal Grills or Combo Grill/Smoker or BBQ Grills]." The product catalog (database) is searched/queried with the extended query shown in Block 611, the query results are received in Block 613 and transmitter to the user in response to the user's input query as shown in Block 615.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system for extending retrieval of relevant information from a knowledge base, the system comprising:
   a communication system;
   a database comprising the knowledge base; and
   a computing device operably connected to the database and the communication system, the computing device configured to:
     access prior engagements including prior queries and prior intents resultant from the prior queries;
     map the prior queries to the prior intents respectively;
     create a first bipartite graph comprising links of the prior queries and the prior intents;
     apply a graph embedding method over the first bipartite graph to measure respective distances between the prior intents;
     group the prior intents together into a plurality of similar intent groups based at least in part by comparing a distance threshold with the respective distances between the prior intents, wherein:
       each of the plurality of similar intent groups is associated with a confidence determined based on the distance threshold and a strength of the prior engagements used to create the first bipartite graph,
       the confidence associated with each similar intent group represents a degree of similarity between intents in the similar intent group,
       the prior engagements are selected from the group consisting of search results, views, clicks, add-to-cart and purchases, which are ordered from weak engagements to strong engagements,
       the confidence associated with each similar intent group becomes higher as the prior engagements are stronger engagements selected from the group,
       the confidence associated with each similar intent group becomes higher as the distance threshold becomes smaller,
       a number of the plurality of similar intent groups is reduced when the confidence becomes higher,
       when the prior engagements are stronger engagements selected from the group, the distance threshold is determined to increase the number of the plurality of similar intent groups, and
       a first intent and a second intent are grouped into a first similar intent group of the plurality of similar intent groups along with other intents;
     receive, after associating the first intent to the second intent, an input query from a user;
     detect the first intent based on the input query via a natural language processor;
     retrieve the first intent, the second intent, and the other intents from the first similar intent group;
     create, after receiving the input query and before querying the database, one single extended query containing all intents in the first similar intent group, by concatenating the first intent, the second intent, and the other intents in such sequential order;
     query the database, with the one single extended query containing all intents in the first similar intent group, to generate extended query results; and
     transmit the extended query results to the user in response to the input query.

2. The system of claim 1, wherein the computing device is further configured to:
associate the prior intents within a respective one of the plurality of similar intent groups.

3. The system of claim 2, wherein the computing device is further configured to store the plurality of similar intent groups.

4. The system of claim 3, wherein the computing device is further configured to retrieve a respective one of the stored plurality of similar intent group of which the first intent is grouped.

5. The system of claim 1, wherein the first and second intents are product types.

6. The system of claim 2, wherein the computing device is further configured to group prior entities that are closer in distance than a threshold.

7. The system of claim 1, wherein the computing device comprises an online shopping assistant.

8. A method for improving search retrieval, comprising:
accessing prior engagements including prior queries and prior intents resultant from the prior queries;
mapping the prior queries to the prior intents respectively;
creating a first bipartite graph comprising links of the prior queries and the prior intents;
applying a graph embedding method over the first bipartite graph to measure respective distances between the prior intents;
grouping the prior intents together into a plurality of similar intent groups based at least in part by comparing a distance threshold with the respective distances between the prior intents, wherein:
each of the plurality of similar intent groups is associated with a confidence determined based on the distance threshold and a strength of the prior engagements used to create the first bipartite graph,
the confidence associated with each similar intent group represents a degree of similarity between intents in the similar intent group,
the prior engagements are selected from the group consisting of search results, views, clicks, add-to-cart and purchases, which are ordered from weak engagements to strong engagements,
the confidence associated with each similar intent group becomes higher as the prior engagements are stronger engagements selected from the group,
the confidence associated with each similar intent group becomes higher as the distance threshold becomes smaller,
a number of the plurality of similar intent groups is reduced when the confidence becomes higher,
when the prior engagements are stronger engagements selected from the group, the distance threshold is determined to increase the number of the plurality of similar intent groups, and
a first intent and a second intent are grouped into a first similar intent group of the plurality of similar intent groups along with other intents;
receiving, after associating the first intent to the second intent, an input query from a user;
detecting the first intent based on the input query via a natural language processor;
retrieving the first intent, the second intent, and the other intents from the first similar intent group;
creating, after receiving the input query and before querying the database, one single extended query containing all intents in the first similar intent group, by concatenating the first intent, the second intent, and the other intents in such sequential order;
querying the database, with the one single extended query containing all intents in the first similar intent group, to generate extended query results; and
transmitting the extended query results to the user in response to the input query.

9. The method of claim 8, wherein the step of associating the first intent to the second intent further comprises:
associating the prior intents within a respective one of the plurality similar intent groups.

10. The method of claim 9, further comprising storing the plurality of similar intent groups.

11. The method of claim 10, wherein the step of retrieving the second intent, comprises retrieving a respective one of the stored plurality of similar intent group of which the first intent is grouped.

12. The method of claim 8, wherein the first and second intents are product types.

13. The method of claim 9, wherein the step of grouping further comprises grouping prior entities that are closer in distance than a threshold.

14. A non-transitory computer readable medium having instructions stored thereon, wherein the instructions, when executed by at least one processor, cause a device to perform operations comprising:
in a first module:
accessing prior engagements including prior queries and prior intents resultant from the prior queries;
map the prior queries to the prior intents respectively;
create a first bipartite graph comprising links of the prior queries and the prior intents;
apply a graph embedding method over the first bipartite graph to measure respective distances between the prior intents;
group the prior intents together into a plurality of similar intent groups based at least in part by comparing a distance threshold with the respective distances between the prior intents, wherein:
each of the plurality of similar intent groups is associated with a confidence determined based on the distance threshold and a strength of the prior engagements used to create the first bipartite graph,
the confidence associated with each similar intent group represents a degree of similarity between intents in the similar intent group,
the prior engagements are selected from the group consisting of search results, views, clicks, add-to-cart and purchases, which are ordered from weak engagements to strong engagements,
the confidence associated with each similar intent group becomes higher as the prior engagements are stronger engagements selected from the group,
the confidence associated with each similar intent group becomes higher as the distance threshold becomes smaller,
a number of the plurality of similar intent groups is reduced when the confidence becomes higher,
when the prior engagements are stronger engagements selected from the group, the distance threshold is determined to increase the number of the plurality of similar intent groups, and
a first intent and a second intent are grouped into a first similar intent group of the plurality of similar intent groups along with other intents;
storing the plurality of similar intents;

in a second module:

receiving, after grouping the prior intents together into the plurality of similar intent groups, an input query from a user;

detecting a first intent based on the input query via a natural language processor;

retrieving a second intent based upon a first similar intent group of the first intent, wherein the first intent and the second intent are grouped into the first similar intent group of the plurality of similar intent groups along with other intents;

retrieving the other intents from the first similar intent group;

creating, after receiving the input query and before querying the database, one single extended query containing all intents in the first similar intent group, by concatenating the first intent, the second intent, and the other intents in such sequential order;

querying a database, with the one single extended query containing all intents in the first similar intent group, to generate extended query results; and transmitting the extended query results to the user in response to the input query.

15. The system of claim 1, wherein the input query comprises a data construct comprising one or more utterances from the user that provides information, and wherein the computer system is further configured to generate a text object containing the information for input to the natural language processor.

16. The system of claim 1, wherein the computer system is further configured to, prior to accessing the prior engagements, provide authentication for access to the prior engagements.

17. The system of claim 1, wherein the degree of similarity is based, at least in part, on a lexical evaluation of the input query.

18. The system of claim 1, wherein the graph embedding method comprises forming a series of at least three bipartite graphs based at least in part on the first bipartite graph.

19. The system of claim 1, wherein the computer system is further configured to store, at the database, the first similar intent group.

20. The system of claim 19, wherein, prior to the receiving the input query, the computer system is further configured to, in response to an identification of a predetermined event or lapse of a predetermined period of time:

access additional prior engagements including additional prior queries and additional prior intents resultant from the additional prior queries;

map the additional prior queries to the additional prior intents respectively;

update the first bipartite graph comprising links of the additional prior queries and the additional prior intents;

apply the graph embedding method over the updated first bipartite graph to measure respective distances between the prior intents and the additional prior intents;

group the additional prior intents and the prior intents together into additional plurality of similar intent groups based at least in part by comparing the distance threshold with the respective distances between the prior intents and the additional prior intents, wherein:

each of the plurality of similar intent groups is associated with a confidence determined based on the distance threshold and the strength of the prior engagements and the additional prior engagements used to update the first bipartite graph, the confidence associated with each similar intent group represents the degree of similarity between intents in the similar intent group, the prior engagements are selected from the group consisting of search results, views, clicks, add-to-cart and purchases, which are ordered from weak engagements to strong engagements, the confidence associated with each similar intent group becomes higher as the prior engagements and the additional prior engagements are stronger engagements selected from the group, the confidence associated with each similar intent group becomes higher as the distance threshold becomes smaller, a number of the additional plurality of similar intent groups is reduced when the confidence becomes higher, and when the prior engagements and the additional prior engagements are stronger engagements selected from the group, the distance threshold is determined to increase the number of the additional plurality of similar intent groups.

* * * * *